United States Patent [19]

Tahara et al.

[11] 4,250,422
[45] Feb. 10, 1981

[54] COOLING MEANS FOR ELECTRICAL ROTATING MACHINE

[75] Inventors: Kazuo Tahara, Hitachi; Fumio Tagima, Ibaraki; Shoji Motegi, Hitachi; Shigeki Saito, Katsuta, all of Japan

[73] Assignee: Agency of Industrial Science and Technology, Tokyo, Japan

[21] Appl. No.: 830,205

[22] Filed: Sep. 2, 1977

[30] Foreign Application Priority Data

Sep. 2, 1976 [JP] Japan .................. 51-104302

[51] Int. Cl.³ .................................. H02K 9/28
[52] U.S. Cl. ........................... 310/227; 310/58
[58] Field of Search ............ 310/52, 238, 227, 62, 310/231, 63, 241, 64, 65, 91, 90, 89, 58

[56] References Cited

U.S. PATENT DOCUMENTS

| 920,725 | 5/1909 | Callan | 310/227 |
|---|---|---|---|
| 1,719,407 | 7/1929 | Trudeau | 310/227 |
| 2,315,177 | 3/1943 | Zadink | 310/227 |
| 2,560,784 | 7/1951 | Sears | 310/227 |
| 2,703,372 | 3/1955 | Savage | 310/227 |
| 2,744,205 | 5/1956 | Kalikow | 310/239 |
| 3,673,447 | 6/1972 | Zumbach | 310/227 |
| 3,791,774 | 2/1974 | Vonk | 310/227 |
| 4,119,873 | 10/1978 | Sakur et al. | 310/62 |

FOREIGN PATENT DOCUMENTS

| 700121 | 2/1931 | France | 310/227 |
|---|---|---|---|
| 51-41803 | 4/1976 | Japan | 310/227 |
| 51-129604 | 11/1976 | Japan | 310/227 |

*Primary Examiner*—R. Skudy
*Attorney, Agent, or Firm*—Birch, Stewart, Kolasch & Birch

[57] ABSTRACT

A cooling device for an electrical rotating machine is provided. The cooling device comprises; a yoke of an electric motor, end brackets and a rocker positioned in the outer circumferential portion of a commutator and fastened through the mediary of ventilation spaces to the inner circumference of one of the aforesaid end brackets. The cooling device further comprises; a screening plate for controlling the direction of cooling air being blown and a strength thereof, which is disposed between one end of the aforesaid rocker and the yoke; and a forcibly blowing device. With this cooling device, the cooling air is introduced through ventilating spaces defined radially inwardly of the aforesaid one end bracket into an electric motor by the forcibly blowing device, thereby forcibly cooling the surface of the commutator and the peripheral portion thereof.

3 Claims, 2 Drawing Figures

COOLING MEANS FOR ELECTRICAL ROTATING MACHINE

BACKGROUND OF THE INVENTION

1. Field of the Invention

This invention relates to a cooling means for an electrical rotating machine, and more particularly to a cooling means for an electrical rotating machine, which is equipped with a cooling air introducing means, for forcibly cooling a commutator unit.

A cooling means for an electrical rotating machine disclosed in Japanese Laid-open Patent Publication No. Sho 51-129,604 (dated Nov. 11, 1976) is such that substantially a cylindrical rocker for use in brush-holders is positioned in the outer circumferential portion of a commutator, and a screening plate is disposed between the rocker-attaching portion and the brush-holders. This arrangement enables to forcibly feed cooling air introduced from a single portion to the commutator uniformly over the entire area thereof.

However, a drawback has been encountered with the above mentioned device, in that, because a ventilation hole is provided on an extension of an axis of respective brush-holder, it is impossible to increase a circumferential length of the rocker from the strength point of view, with the failure to provide a diametrically sufficiently large ventilation hole. Because of a small ventilation hole, an increased ventilation resistance results, thus failing to provide a cooling effect required.

2. Description of the Prior Art

The cooling means of this type for an electrical rotating machine is also proposed by Japanese Laid-open Patent Publication No. 51-41,803 (Apr. 8, 1976). This cooling means is so arranged that a cooling air is introduced from a lateral portion of an end bracket, and fed to the commutator surface in the direction of brushes.

Furthermore, U.S. Pat. No. 3,673,447 (issued June 27, 1972) discloses a cooling means of the type described.

As well known, the cooling of an electric motor is particularly directed to a field coil and a commutator. For this purpose, various cooling systems are adopted, such as a forcibly cooling system by means of a fan, a cooling system by means of a heat-pipe, and a forcibly cooling system by means of a blower. Particularly the blower cooling system is most effective for effecting concentrated cooling of portions required, with satisfactory cooling performance.

The blower cooling system however is impractical for cooling a DC electric motor used in an electric automotive, because a limited loading space of the electric automotive can not afford to provide a ventilating and cooling air passage therein.

SUMMARY OF THE INVENTION

In order to provide a cooling air passage, it has been a general practice to use a rocker attached to a brush. However, it is almost impossible to provide a cooling means reduced in size, increased in strength of the rocker and improved in cooling performance.

According to the present invention, there is provided a cooling means for an electric rotating machine. The cooling means comprises; a yoke of an electric motor, end brackets and a rocker positioned in the outer circumferential portion of a commutator and fastened through the mediary of ventilation spaces to the inner peripheral wall of one of the aforesaid end brackets. The cooling means further comprises; a screening plate for controlling the direction of cooling air being blown and a strength thereof, which is disposed between one end of the aforesaid rocker and the yoke; and a forcibly blowing means. With this cooling means, the cooling air is introduced through the ventilation spaces defined radially inwardly of the aforesaid one end bracket into the electric motor by the aforesaid forcibly blowing means, thereby forcibly cooling the surface of the commutator and the peripheral portion thereof.

In a preferred embodiment of the present invention, the cooling means is so arranged that a rocker is of a cylindrical shape, so as to facilitate the smooth flowing of a cooling air introduced radially of the rocker as well as to provide ease of attachment of brush means thereto.

DESCRIPTION OF THE PREFERRED EMBODIMENTS

Figure 1:
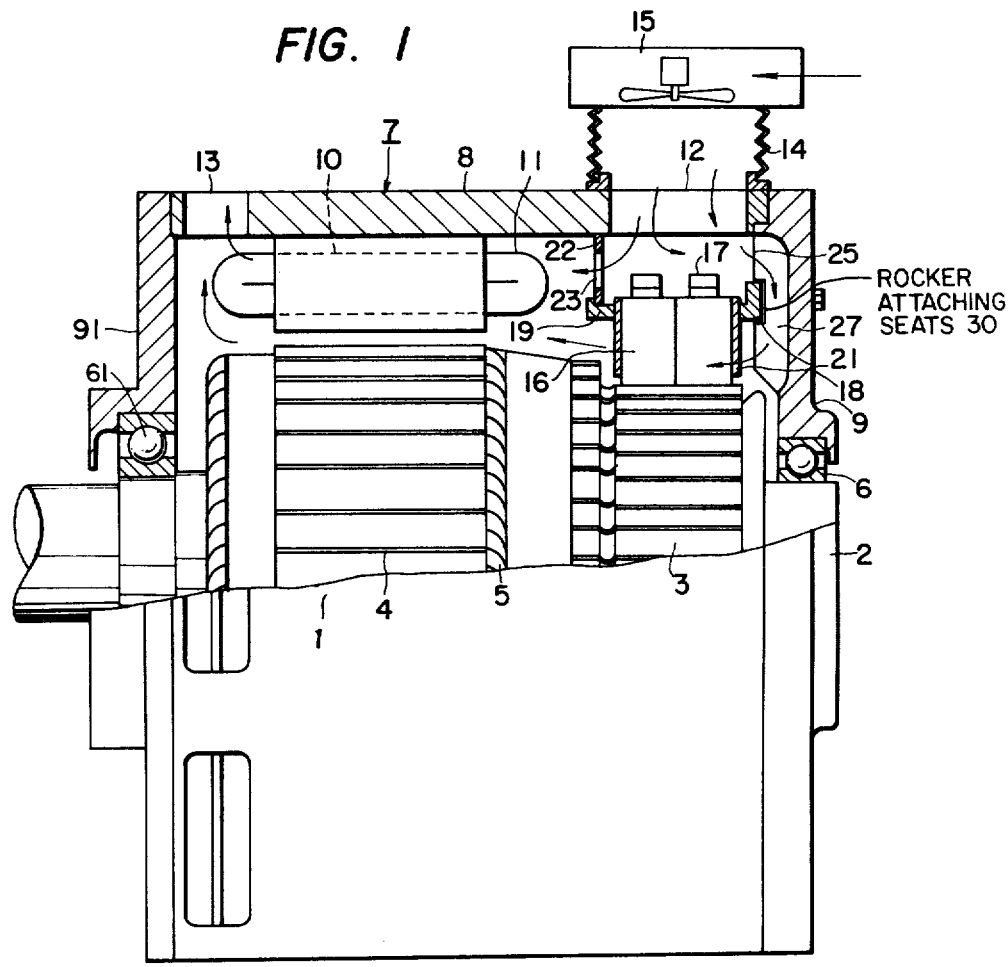
FIG. 1 is a cross sectional view of an electric motor wherein the present invention is embodied.
Figure 2:
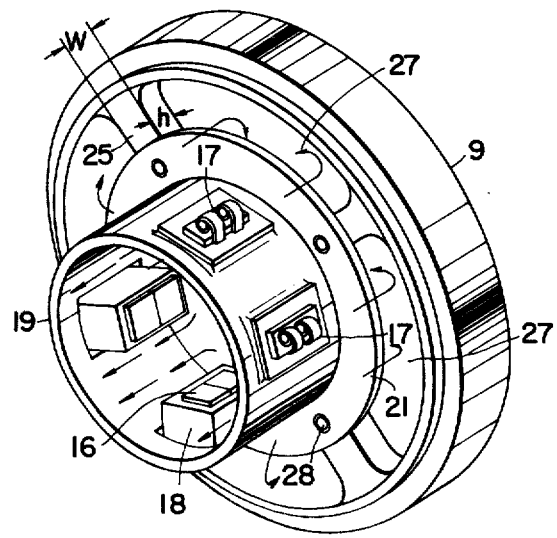
FIG. 2 is a perspective view of an assembly of rocker and end bracket according to an embodiment of the present invention.

Reference will be had to preferred embodiment of the present invention in conjunction with FIGS. 1 and 2. Shown at 1 is a rotor consisting of a shaft 2, commutator 3, armature core 4 and armature winding 5 and journaled in bearings 6,61 on a stator 7. Stator 7 includes a cylindrical yoke 8 and end brackets 9,91. As shown in FIG. 1, the end brackets 9,91 are circumferentially disposed around the rotary shaft 2. A main pole core 10 is attached to the inner peripheral wall of yoke 8 in opposed relation to and at a small spacing from armature core 4. A stator winding 11 is wound to the main pole core 10. Air inlets 12 of a desired number are provided on one side of yoke 8 and air outlets 13 on the other side thereof. A blower 15 is coupled by way of a connected pipe 14 to air inlets 12.

Shown at 16 are brushes which are urged against commutator 3 under the action of springs 17, respectively, and which are supported by brush-holders 18, that in turn are rigidly secured to a rocker 19. Rocker 19 is substantially of a cylindrical shape and has a plurality of brush-attaching holes in the periphery thereof. Brush-holders 18 are accommodated in these holes and screwed into the walls thereof. Designated 21 is a disc-shaped flange provided at one end of rocker 19 as seen in FIG. 2. Flange 21 is bolted to one ends of a plurality of radial ribs 25 extending from the inner circumference of end bracket 9. Ventilation gaps 27 defined by respective rib 25, flange 21 and the inner circumference of end bracket 9 serve as cooling air passages in combination with a ventilation window 23 in screening plate 22 attached to the other end of rocker 19.

For the purpose of producing a dimensional precision in fixing the flange (21) to the radial ribs (25), a wedge-shaped cut 30 is made to each of the radial ribs (25), as shown in FIG. 1. This wedge-shaped cut 30 on the radial ribs (25) or the face of the flange (21) which contact with the radial ribs (25) is called the rocker attaching seat. Further, these rocker attaching seats are not necessarily required to be a wedge-shaped cut, but could have a convex shape or otherwise if it is a structure which is sufficient to fix the flange (21) to the designated position.

Respective radial rib 25 extending from end bracket 9 has a length (shown at h in FIG. 2) commensurate to the amount of cooling air being introduced, and rocker 19 should be attached to respective ribs in a manner that respective rib is positioned mid way between respective adjoining brush-holders 18. To this end, holes for screw bolt 28 for fastening rocker flange 21 to ribs 25 are provided at a middle point between brush-holders 18, respectively. A width (shown at W in FIG. 2) of each rib 25 may be equal in the radially inner portion thereof and in the radially outer portion. However, in order to increase a ventilation cross sectional area, the width of the radially inner portion of rib be preferably narrower than that of the radially outer portion thereof. At least three ribs 25 should be provided in consideration of stability of rocker 19 attached thereto. Where more than two brush-holders 19 are provided, the number of ribs 25 may be equal to the number of brush-holders 18.

In the embodiment described, ribs 25 extend from the inner circumference of end bracket 9. In place of the ribs, build-up portions (attaching seats) may be provided on the inner peripheral surface of end bracket 9 integrally therewith or separately therefrom, at a given spacing for providing ventilation gaps, and the rocker flange may be attached to these build-up portions. In the embodiment shown, rocker 19 is of a cylindrical shape, but may be of a polygonal shape.

In operation, if an electric motor is driven, blower 15 is driven in synchronism therewith. Air is then introduced through air inlets 12. The air thus introduced is partly guided by ribs 25 extending from end bracket 9 to pass through ventilation gaps 27 defined by flange 21 and end bracket 9, through a space between brush-holders 18 and the outer periphery of commutator 3 in the axial direction, and thence, through a gap between the outer periphery of rotor 1 and stator winding 11 to the air outlets 13. The remainder of air flows through ventilation windows 23 in screening plate 22 to the surface of stator winding 11 and is discharged through air outlets 13. The ventilation gaps defined between flange 21 and end bracket 9 are arcuate, and ribs 25 serve as to guide members for cooling air as well as control the streams of air under the fan action caused by the rotation of commutator 3. As a result, the cooling air is readily introduced uniformly to the side of commutator 3, and ventilation resistance decreases, resulting in an improved cooling effect. This provides a uniform temperature rise at respective winding as well as at respective brush.

Tests were carried out by applying the present invention to a DC electric motor of 30 KW and 110 V. When the rated load of 3,000 rpm was applied to the electric motor, the commutator was cooled to 80° C. (90° C. in a prior art device), and the armature winding was cooled to 110° C. (115° C. in the device disclosed in the above cited Japanese laid-open Publication No. 51-129,604;).

With the construction so far described, not only the commutator unit and winding portions but also the end brackets can be cooled, and therefore, the aforesaid construction may be availed for cooling the bearing portion. Where it is designed that ribs 25 extend from the inner circumference of end bracket 9, reduction in a wall thickness of end bracket 9 is attained without impairing the strength of the bracket in the device disclosed in Japanese laid-open Publication No. 51-14 129,604. Since rocker 19 has no opening, the increased strength of the rocker results. The shortened axial length of rocker 19 leads to the simplicity in construction and enables reduction in weight. The embodiment shown is so arranged as to positively cool the commutator unit and stator winding. Taking in view the fact that a temperature rise at the stator winding 11 is lower than that at the commutator unit, the screening plate 22 may be replaced by a blind plate, so that the cooling air may be introduced only to the commutator unit.

The provision of the ribs radially inwardly extending from the inner circumference of end bracket or the provision of build-up portions on the inner peripheral wall thereof enables the cooling air to concentrate uniformly to the circumferential direction of the commutator unit. Furthermore, a small ventilation resistance and a greatly improved cooling effect result, thus eliminating the drawback experienced with a prior art device. The cooling means itself is reduced in weight as well as in size, increased in mechanical strength and highly resistant to vibration.

What is claimed is:

1. In an electrical rotating device comprising a rotor containing an armature and a commutator disposed on a rotary shaft, said rotary shaft being supported within a yoke member, air inlets and air outlets disposed in said yoke member and means for introducing air through said air inlets and removing air through said outlets, the improvement which comprises;

a cooling device provided for said electrical rotating device including a cylindrically shaped rocker means terminating at one end in a disc-shaped flange, a bracket means, having a larger diameter than said disc-shaped flange, circumferentially disposed around said rotary shaft, radially extending rib means providing a fixed attachment of the bracket means with the disc-shaped flange of the rocker means, said bracket means and said disc-shaped flange defining therebetween a ventilation gap, and at least one brush means disposed in said rocker means and extending in the radially inward direction, said cooling device being disposed within the yoke of the electrical rotating device in close proximity to the air inlets and adapted to surround the commutator, thereby facilitating the flow of the cooling air from the air inlets through the open space formed between the outer circumference of the commutator and the brushes.

2. The electrical rotating device of claim 1, further containing a stator winding wound to a main pole core, said cooling air being adapted to flow through the space formed between the outer circumference of the armature and the inner circumference of the main pole core.

3. In an electrical rotating device comprising a rotor containing an armature, a commutator and a rotary shaft, front and rear end brackets provided for supporting the rotor, a yoke member installed between the end brackets facing toward the armature and the commutator, air inlets disposed on one side of the yoke member and air outlets disposed on the other side of the yoke member, main pole cores installed along the inner circumference of the yoke body facing toward the armature, blowers connected with the air inlets, a cylindrically shaped rocker joined to the end of the commutator on the yoke side and, at the same time, structured in a form concentric with the commutator and facing toward the outer circumference of the commutator, brush holders disposed in the rocker, said brush holders containing brushes which are urged against the commutator by spring means, screening plates installed between one end of the cylindrically shaped rocker on the armature side and one end of the yoke on the air inlets side, said screening plates containing ventilation windows which let the cooling air introduced through the air inlets run through a space formed between the main pole cores and the armature toward the air outlets, the improvement which comprises, a cooling means associated with the rotary device, said cooling means comprising a disc-shaped flange extending from one end of the cylindrically shaped rocker toward the air inlets with its diameter being smaller than that of the end brackets, rib members placed in radial directions between the disc-shaped flange and the end brackets, and a ventilation gap disposed between the rib members and the disc-shaped flange and the inner circumference of the end bracket in order to facilitate flow of the cooling air introduced in through the air inlets through the open space formed between the outer circumference of the commutator and the brushes and the space formed between the outer circumference of the armature and the inner circumference of the main pole cores.

* * * * *